United States Patent
Ulke et al.

(10) Patent No.: US 11,901,520 B2
(45) Date of Patent: Feb. 13, 2024

(54) LITHIUM-ION CELL FOR AN ENERGY STORAGE UNIT OF A MOTOR VEHICLE, AND METHOD FOR PRODUCTION THEREOF

(71) Applicant: VARTA Microbattery GmbH, Ellwangen (DE)

(72) Inventors: Jakob Ulke, Wolfsburg (DE); Alexander Börger, Wolfsburg (DE); Simon Calles, Wolfsburg (DE); Torsten Knape, Wolfsburg (DE)

(73) Assignee: VARTA Microbattery GmbH, Ellwangen (DE)

( * ) Notice: Subject to any disclaimer, the term of this patent is extended or adjusted under 35 U.S.C. 154(b) by 705 days.

(21) Appl. No.: 16/978,372

(22) PCT Filed: Apr. 16, 2019

(86) PCT No.: PCT/EP2019/059859
§ 371 (c)(1),
(2) Date: Sep. 4, 2020

(87) PCT Pub. No.: WO2019/170924
PCT Pub. Date: Sep. 12, 2019

(65) Prior Publication Data
US 2021/0043984 A1    Feb. 11, 2021

(30) Foreign Application Priority Data
Mar. 8, 2018  (DE) ................. 10 2018 203 512.1

(51) Int. Cl.
*H01M 10/42*    (2006.01)
*H01M 10/0525*  (2010.01)
(Continued)

(52) U.S. Cl.
CPC ..... *H01M 10/4257* (2013.01); *H01M 10/058* (2013.01); *H01M 10/0525* (2013.01);
(Continued)

(58) Field of Classification Search
CPC ......... H01M 10/4257; H01M 10/0525; H01M 10/058; H01M 10/48; H01M 2010/4271;
(Continued)

(56) References Cited

U.S. PATENT DOCUMENTS

2011/0250478 A1* 10/2011 Timmons ............. H01M 4/587
429/91
2013/0323542 A1    12/2013 Wijayawardhana et al.

FOREIGN PATENT DOCUMENTS

CN    1541333 A    10/2004
CN    104979591 A   10/2015
(Continued)

OTHER PUBLICATIONS

International Search Report and Written Opinion for PCT/EP2019/059859 dated Jul. 9, 2020, 10 pages.
(Continued)

*Primary Examiner* — Gary D Harris
(74) *Attorney, Agent, or Firm* — Sheppard Mullin Richter & Hampton LLP

(57) ABSTRACT

The invention relates to a lithium-ion cell (1) for an energy storage unit of a motor vehicle, having at least one anode (3), at least one cathode (4), an electrolyte and a separator (7) arranged between the cathode (4) and anode (3) in the electrolyte, and having a reference electrode (8) for determining a voltage potential of the lithium-ion cell (1). The reference electrode (8) is produced from lithium titanate.

3 Claims, 1 Drawing Sheet

Figure 1A:
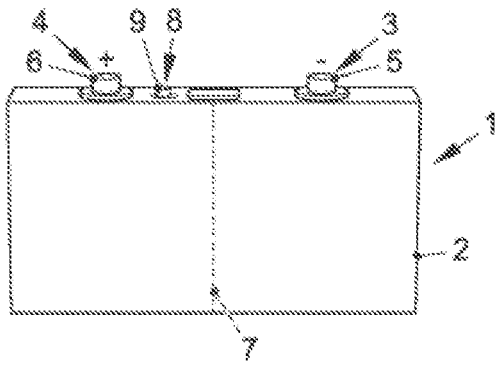

(51) Int. Cl.
*H01M 10/058* (2010.01)
*H01M 10/48* (2006.01)

(52) U.S. Cl.
CPC .... *H01M 10/48* (2013.01); *H01M 2010/4271* (2013.01); *H01M 2220/20* (2013.01)

(58) Field of Classification Search
CPC ............. H01M 2220/20; H01M 50/46; H01M 10/425; H01M 10/0413; H01M 10/0587; H01M 4/1391; H01M 4/485; H01M 4/131; Y02E 60/10; Y02P 70/50
USPC .......................................................... 429/90
See application file for complete search history.

(56) References Cited

FOREIGN PATENT DOCUMENTS

| | | |
|---|---|---|
| CN | 105308786 A | 2/2016 |
| CN | 109154637 A | 1/2019 |
| CN | 109252172 A | 1/2019 |
| CN | 109428113 A | 3/2019 |
| DE | 102014001260 A1 | 7/2015 |
| DE | 102017119602 A1 | 3/2018 |
| EP | 2442400 A1 | 4/2012 |
| EP | 2725641 A2 | 4/2014 |
| JP | 2014127234 A | 7/2014 |
| TW | 200604383 A | 2/2006 |

OTHER PUBLICATIONS

Salkus et al., "XPS and Ionic conductivity studies on Li1.3 Al0.15 Y0.15 Ti1.7(PO4)3 ceramics", Ionics, 2010, 16:631-637.

* cited by examiner

LITHIUM-ION CELL FOR AN ENERGY STORAGE UNIT OF A MOTOR VEHICLE, AND METHOD FOR PRODUCTION THEREOF

CROSS REFERENCE TO RELATED APPLICATIONS

This application is a U.S. National Stage Application under 35 U.S.C. 371 of International Application No. PCT/EP2019/059859, filed Apr. 16, 2019, which claims priority to German Patent Application 10 2018 203 512.1, filed Mar. 8, 2018. The contents of each of the aforementioned are hereby incorporated by reference in their entirety into the present disclosure.

The invention relates to a lithium-ion cell for an energy storage unit of a motor vehicle, in particular a traction battery, having at least one anode, at least one cathode, an electrolyte and a separator arranged between the cathode and anode in the electrolyte, and having a reference electrode for determining a voltage potential of the lithium-ion cell.

The invention further relates to a method for producing such a lithium-ion cell for an energy storage unit of a motor vehicle, wherein an anode, a cathode, an electrolyte and a separator are provided between the anode and cathode in the electrolyte.

Lithium-ion cells and manufacturing methods of the type mentioned at the outset are known from the prior art. In conventional lithium-ion cells, the anode and cathode are usually electrically connected to one another by an electrolyte, which is usually a non-aqueous electrolyte solution. The separator arranged between the anode and cathode allows lithium ions to migrate freely through the electrolyte between the two electrodes, i.e. anode and cathode. By adding a reference electrode as a third electrode, it is possible to determine the half-cell potential of the anode and cathode separately from one another, so that a detailed determination can be made about the state of charge and the state of aging of the cell. Such reference electrodes are usually made of lithium metal, which, however, has a low long-term stability and is less suitable for impedance-spectroscopic measurements. It is also known from "F. La Mantia, C. D. Wessells, H. D. Deshazer, Yi Curi: Reliable reference electrodes for lithium-ion batteries. Electrochemistry Communications 31 (2013) 141-144," to manufacture reference electrodes from lithium iron phosphate and lithium titanium oxide, the reference electrodes being applied point-like. From "J. Costard, M. Ender, M. Weiss, E. Ivers-Tiffée: Three-Electrode Setups for Lithium-ion Batteries II," it is also known to provide a reference electrode by coating a metal grid.

The invention is based on the object of creating an improved lithium-ion cell that can be used both for impedance-spectroscopic purposes and, moreover, shows little signs of aging.

The object on which the invention is based is achieved by a lithium-ion cell with the features of claim 1. This has the advantage that the lithium-ion cell has a long service life overall, in particular with regard to the reference electrode used, and that impedance-spectroscopic measurements, in particular for determining the state of aging of the lithium-ion cell, can be carried out reliably and for a long time. According to the invention, this is achieved in that the reference electrode is made of lithium titanate. This results in an advantageous suitability for impedance spectroscopic measurement and a robustness of the reference electrode which ensures a long service life.

In particular, the reference electrode is pressed from lithium titanate powder. This results in a simple and inexpensive production of the reference electrode, which then leads to the advantages mentioned above.

The reference electrode is particularly preferably pressed onto the separator. This ensures easy integration of the reference electrode into the lithium-ion cell.

The method according to the invention with the features of claim 4 is characterized in that the reference electrode is made from lithium titanate. This results in the advantages already mentioned.

The reference electrode is preferably produced by pressing lithium titanate powder. The reference electrode is particularly preferably produced by longitudinally displacing a press ram or pin.

Furthermore, it is preferably provided that the reference electrode is pressed directly onto the separator.

Figure 2:
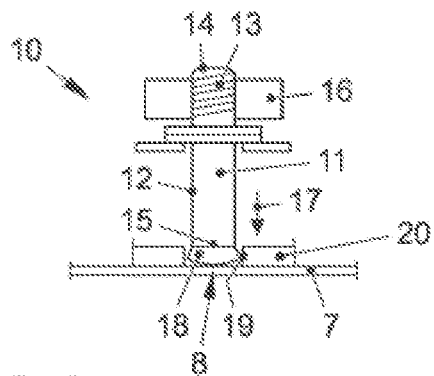

This results in the advantages already mentioned in each case. Further advantages and preferred features and combinations of features emerge in particular from what has been described above and from the claims. The invention will be explained in more detail below with reference to the drawings. The drawings show:

FIGS. 1A and B a lithium-ion cell in a side view and in a top view,

FIG. 2 an apparatus for producing the lithium-ion cell and

Figure 3:
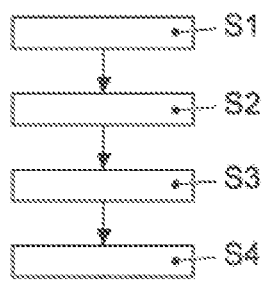

FIG. 3 a method of manufacturing the lithium-ion cell.

Figure 1B:
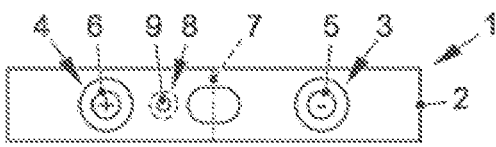

FIGS. 1A and 1B show a lithium-ion cell 1 for an energy storage unit of a motor vehicle, which is used in particular as a traction battery for the motor vehicle. The lithium-ion cell 1 is shown in FIG. 1A in a side view and in FIG. 1B in a plan view of the connections. The lithium-ion cell 1 has a housing 2 in which an anode 3 and a cathode 4 are arranged, from which external connections 5 and 6 protrude from the housing 2 for their electrical contacting. An electrolyte, preferably composed of a non-aqueous electrolyte solution, is also present in the housing 2, as is a separator 7, indicated by a dashed line, which lies between anode 3 and cathode 4.

In addition, the lithium-ion cell 1 has a reference electrode 8, which has a connection 9 protruding from the housing 2 for making electrical contact. The reference electrode 8 is made of lithium titanate powder.

FIG. 2 shows a device 10 for producing the reference electrode 8 of the lithium-ion cell 1. The device 10 has a press ram 11, which has a plastic sleeve 12 and a metal stud 13 connected to it. The metal bolt 13 has a thread 14 at one free end and is inserted into the plastic sleeve 12 at its other end. At its end facing away from the thread 14, the plastic sleeve 12 has a closed base 15 which serves as a press ram. The metal bolt 13 acts in the manner of a spindle of a spindle drive and is correspondingly coupled at its free end to the thread 14 with a spindle nut 16. By rotating the spindle nut 16, the ram 11 can be displaced in its longitudinal direction, as indicated by an arrow 17 in FIG. 2.

Lithium titanate powder 18 is arranged between the press ram 11 and the separator 7, in particular before the separator 7 is introduced into the housing 2, preferably in a depression or recess 19 of a mask 20 placed on the separator 7, and then is pressed by the press ram 11 against the anode 7, so that the reference electrode 8 made of lithium titanate is obtained.

FIG. 3 summarizes the production method again in a flow chart. In a first step S1, the lithium-ion cell 1 is provided with cathode 4 and anode 3 and electrolyte. If necessary, the anode 3 and cathode are provided on an electrode coil which, as a base element, has a strip which forms the separator 7 and on which the cathode 4 and anode 3 are arranged. Before this winding is introduced into the housing 2, it is fed to the device 10 in a step S2 and the reference electrode 8 is produced.

Subsequently, in a step S3, the winding together with the reference electrode 8 is introduced into the housing 2 in such a way that the reference electrode 8 can be contacted from the outside, as shown in FIG. 1A and described accordingly. Thus, finally, the lithium-ion cell 1 is obtained in step S4 with an advantageous reference electrode 8 made of lithium titanate, which ensures a long service life and advantageous properties for an impedance-spectroscopic measurement.

LIST OF REFERENCE SYMBOLS

1 Lithium-ion cell
2 Housing
3 Anode
4 Cathode
5 Connection
6 Connection
7 Separator
8 Reference electrode
9 Connection
10 Apparatus
11 Press ram
12 Plastic sleeve
13 Metal stud
14 Thread
15 Base
16 Spindle nut
17 Arrow
18 Lithium titanate powder
18 Recess
20 Mask

The invention claimed is:

1. A lithium-ion cell (1) for an energy storage unit in a motor vehicle, comprising at least one anode (3), at least one cathode (4), an electrolyte and a separator (7) arranged between the cathode (4) and anode (3) in the electrolyte, and having a reference electrode (8) for determining a voltage potential of the lithium-ion cell (1), characterized in that the reference electrode (8) comprising lithium titanate powder is pressed directly onto the separator (7).

2. A method for producing a lithium-ion cell (1) for an energy storage unit of a motor vehicle, comprising: an anode (3), a cathode (4), an electrolyte and a separator (7) arranged between the anode (3) and the cathode (4), and further comprising a reference electrode (8), wherein the reference electrode (8) comprises lithium titanate powder, wherein the reference electrode (8) is pressed directly onto the separator (7).

3. The lithium-ion cell of claim 1, wherein the reference electrode is disposed between the cathode and the anode and is coplanar with the cathode and the anode.

\* \* \* \* \*